United States Patent [19]

Gram

[11] 4,318,279
[45] Mar. 9, 1982

[54] FREEZING OR COOLING PLANT COMPRISING AN OIL SEPARATOR

[75] Inventor: Hans Gram, Vojens, Denmark

[73] Assignee: Brødrene Gram A/S, Vojens, Denmark

[21] Appl. No.: 175,631

[22] Filed: Aug. 6, 1980

[30] Foreign Application Priority Data

Aug. 13, 1979 [DK] Denmark .............................. 3389/79

[51] Int. Cl.³ .............................................. F25B 43/02
[52] U.S. Cl. .................................... 62/470; 62/84
[58] Field of Search ................... 62/84, 468, 470, 471

[56] References Cited

U.S. PATENT DOCUMENTS 2,418,962 4/1947 Zwickl .................................. 62/470
2,697,919 12/1954 Raver .................................. 62/471

FOREIGN PATENT DOCUMENTS 834854 2/1952 Fed. Rep. of Germany .

*Primary Examiner*—Ronald C. Capossela
*Attorney, Agent, or Firm*—Watson, Cole, Grindle & Watson

[57] ABSTRACT

A freezing or cooling plant comprises a compressor for compressing a refrigerant, and a condenser for condensing the refrigerant. Moreover, the plant comprises an apparatus to be cooled, e.g. a continuously driven ice cream freezing apparatus. An oil separator is connected with the lowermost part of the evaporator compartment of the apparatus by means of a pipe wherein a shut-off-valve is provided. If the risk should arise that the apparatus stops due to a too hard freezing of the material treated in the apparatus, the evaporator compartment may rapidly be emptied by opening the valve.

4 Claims, 5 Drawing Figures

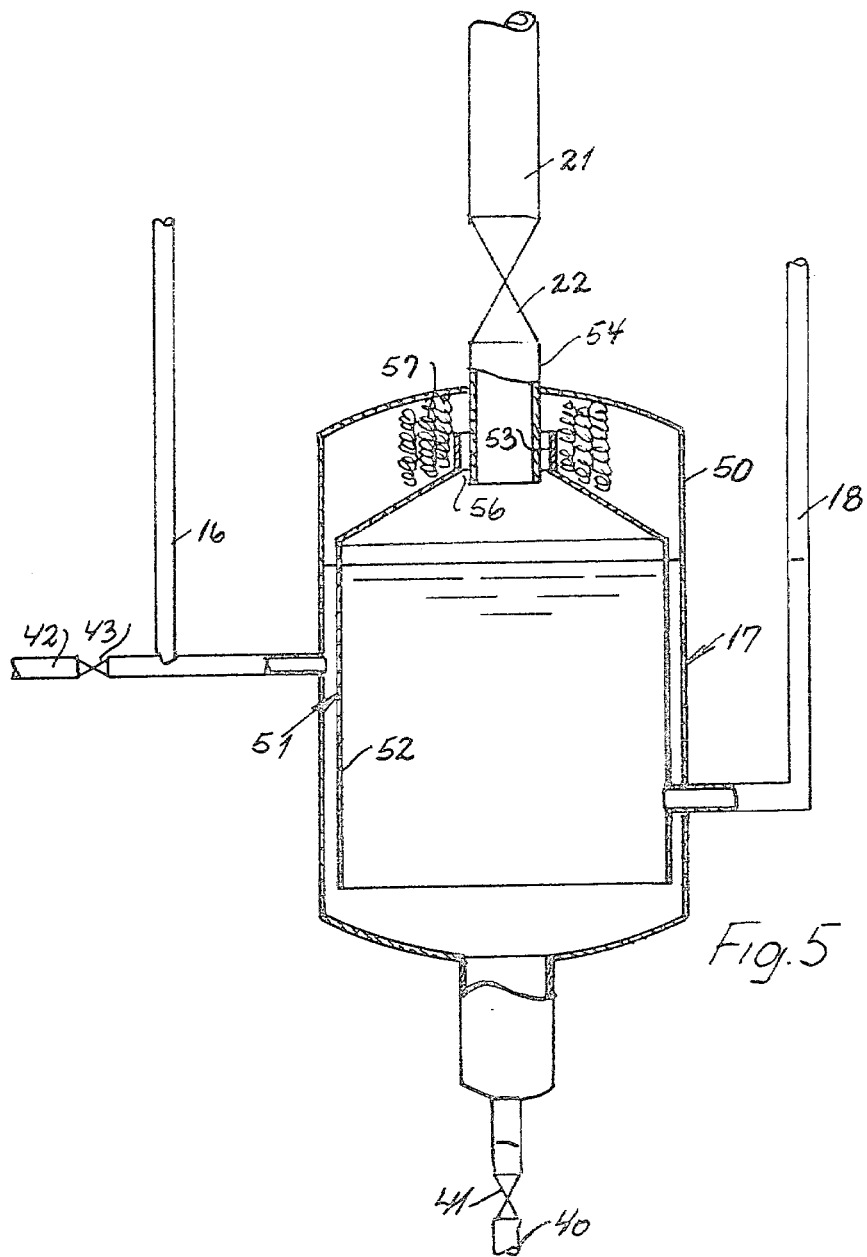

FREEZING OR COOLING PLANT COMPRISING AN OIL SEPARATOR

BACKGROUND OF THE INVENTION

The present invention relates to a freezing or cooling plant comprising a compressor for compressing a refrigerant and a condenser for condensing the refrigerant and comprising an apparatus to be cooled, e.g. a continuously driven ice cream freezing apparatus, and wherein the plant comprises an oil separator.

A freezing or cooling plant of the kind referred to above is known from German patent specification No. 834854. According to this known plant, the apparatus to be cooled consists of an evaporator and the evaporator is arranged at a lower level than the oil separator.

SUMMARY OF THE INVENTION

It is the object of the present invention to provide a freezing or cooling plant of the kind referred to above, according to which it is possible almost immediately to stop the cooling of the apparatus, and this object is, according to the present invention, achieved in that the oil separator is arranged below the apparatus to be cooled and is connected to the lowermost part of the evaporator compartment of the apparatus by means of a pipe, wherein a shut-off-valve is arranged. By means of this construction it is achieved that cooling of the apparatus may be stopped almost immediately, viz. by opening the shut-off-valve whereby liquid refrigerant which may be present in the evaporator compartment of the apparatus, will be transferred to the oil separator by gravity.

An advantageous embodiment of the freezing or cooling plant according to the present invention is characterized in that the oil separator is connected with the outlet for liquid refrigerant from the condenser via a pipe connection wherein a control valve is arranged, and in that the oil separator, at a location positioned below the location at which the oil separator is connected with the control valve, is connected with the evaporator compartment of the apparatus to be cooled. This embodiment of the plant is advantageous in that the whole or at least a considerable portion of the refrigerant which is fed to the evaporator compartment of the apparatus, will pass through the oil separator approximately at a pressure which prevails in the evaporator compartment and, accordingly, after the pressure of the refrigerant has been reduced by means of the control valve. Accordingly, boiling in the oil separator is avoided, and the oil may be separated in the oil separator almost without being whirled up and may be discharged from the oil separator as required. This effect is achieved due to the height difference between the location at which the oil separator is connected with the control valve and the location at which the oil separator is connected with the evaporator compartment, because this difference secures, that the vapour formed by the passage of the refrigerant through the control valve and due to the pressure difference over the control valve, will be prevented from flowing through the liquid collected in the oil separator below the level corresponding to the location at which the oil separator is connected with the evaporator compartment.

A further embodiment of the freezing or cooling plant according to the present invention is characterized in that the evaporator compartment is provided with a pocket arranged at the bottom of the evaporator compartment, and to which the oil separator is connected. By means of this embodiment it is achieved that the pocket may serve as an additional oil separator.

In case a plant is concerned which is provided with a liquid separator arranged above the apparatus and wherein a float valve is arranged which serves to feed the evaporator compartment with refrigerant, the float valve may according to a further embodiment of the invention, be constituted by the control valve arranged between the condenser and the oil separator, and the oil separator may be connected with the evaporator compartment via the liquid separator. By means of this embodiment it is achieved that the float valve will serve both as the control valve previously mentioned and as a device for maintaining the level of the refrigerant in the liquid separator so as to secure a correct feeding of the apparatus with the liquid refrigerant required.

A still further embodiment of the invention is characterized in that the liquid separator is connected with the evaporator compartment via the pocket referred to above. By means of this embodiment it is achieved that oil which may be carried along with the refrigerant from the liquid separator and to the evaporator compartment and which may settle upon the inner surface of the pipe which connects the liquid separator and the evaporator compartment, will be separated in the pocket referred to, and, accordingly, the purification of the refrigerant for oil will be further supported.

A still further embodiment of the freezing or cooling plant according to the invention is characterized in that the oil separator is connected with the liquid separator by means of a riser pipe, which opens into the liquid separator above the level of the refrigerant adjusted in the liquid separator by means of the float valve. By means of this embodiment it is avoided that liquid or vapour formed refrigerant which is transferred from the oil separator to the liquid separator has overcome a counter pressure caused by the liquid refrigerant in the liquid separator.

A still further embodiment of the freezing or cooling plant is according to the invention characterized in that the oil separator comprises a container wherein a bell shaped baffle is arranged, the lower edge of which ends at a level which is positioned below the location at which the oil separator is connected with the evaporator compartment, that the control valve is connected with the space between the container and the baffle, that the interior of the baffle is connected with the evaporator compartment, that the top of the bell shaped baffle is provided with an opening, and that an oil drop collecting material is arranged around the opening and between the top of the baffle and the top of the container. By means of this embodiment it is achieved that the lower edge of the baffle will serve as a trap in the oil separator which will cause the vapour fed to the oil separator to pass the oil drop collecting material. Moreover, the baffle will serve as an impinge device for the mixture of vapour and liquid which flows into the oil separator, whereby the oil separation effect in the oil separator is supported.

BRIEF DESCRIPTION OF THE DRAWINGS

FIG. 5 shows the oil separator in FIG. 4 during a stop period.

DESCRIPTION OF THE PREFERRED EMBODIMENT

Figure 1:
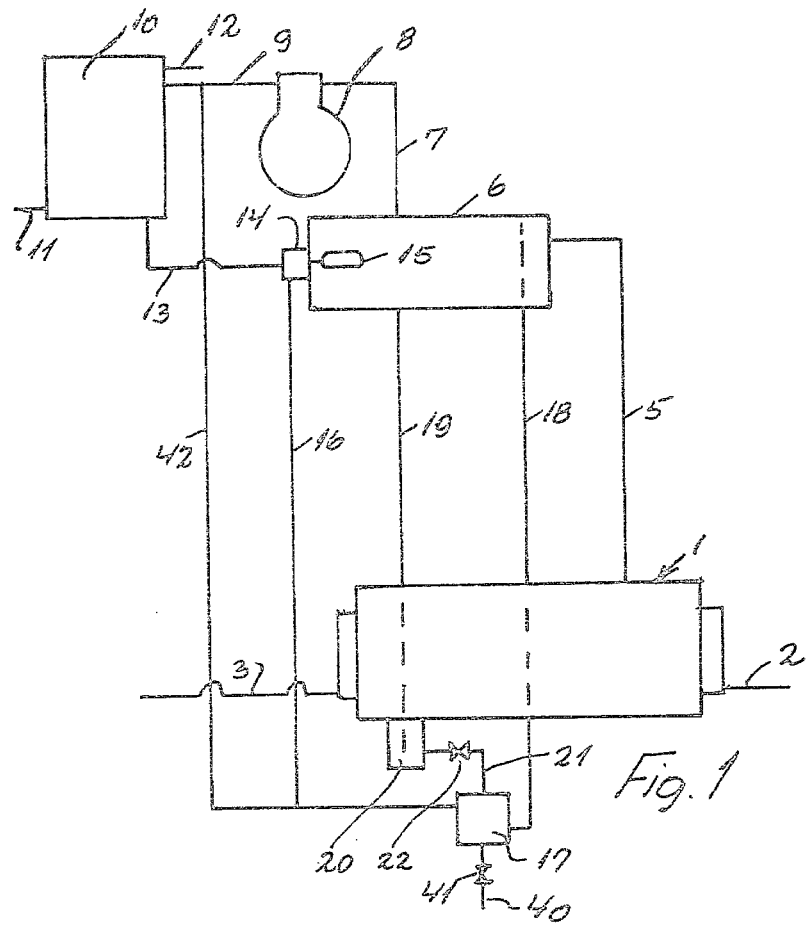
FIG. 1 very diagramatically shows an embodiment of the cooling or freezing plant according to the present invention, FIG. 2 on an increased scale and more detailed shows a part of the plant shown in FIG. 1 during operation.

On the drawing 1 is an apparatus to be cooled and which according to the embodiment shown is a continuously working ice cream freezer. The cream to be frozen is fed to the apparatus through a conduit 2 and leaves the apparatus through a conduit 3. The part of the apparatus to be cooled is surrounded by an evaporator jacket 4, FIG. 2, which forms an evaporator compartment which by means of a transfer pipe 5 is connected with the top of a liquid separator 6. The liquid separator 6 is arranged above the apparatus 1, and a suction pipe 7 connects the top of the liquid separator 6 with the suction side of a compressor 8, the pressure side of which by means of a conduit 9 is connected with a condenser 10. In the embodiment illustrated, the condenser 10 is cooled by liquid which is fed to the condenser via a connection 11 and is removed from the condenser via a connection 12.

Condensed refrigerant is fed from the condenser 10 via a conduit 13 to a control valve 14 which is controlled by means of a float 15 arranged in the liquid separator 6. The control valve 14 is via a pipe connection 16 connected with an oil separator 17 which is arranged below the apparatus 1. The oil separator 17 is by means of a riser pipe 18 connected with the liquid separator 6.

The evaporator compartment of the apparatus is fed from the liquid separator 6 via a downpipe 19 which extends from the bottom of the liquid separator 6 and to a pocket 20 which is in open communication with the evaporator compartment of the apparatus 1. The oil separator 17 and the pocket 20 are mutually connected by means of a pipe 21 wherein a shut-off-valve 22 is arranged.

Figure 2:
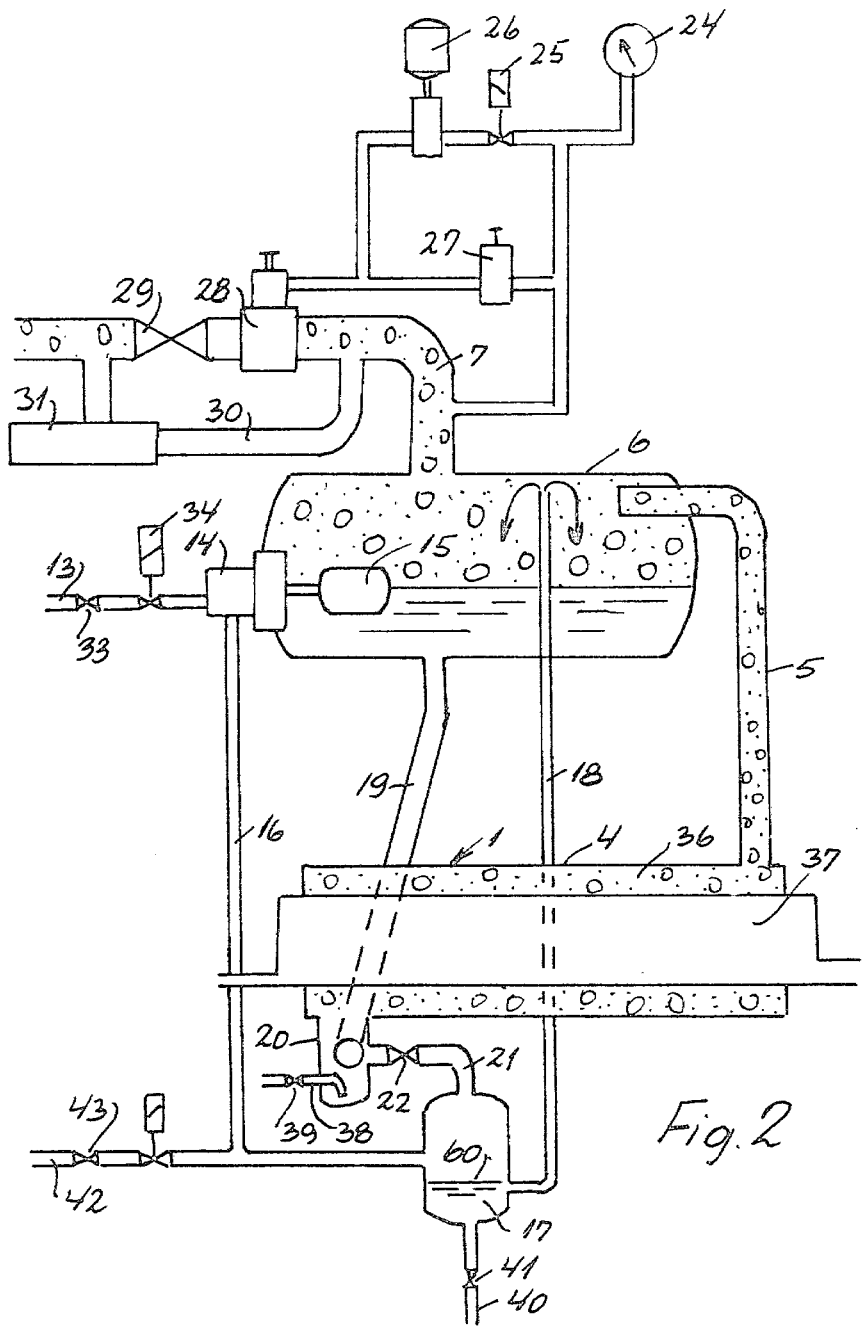
Figure 3:
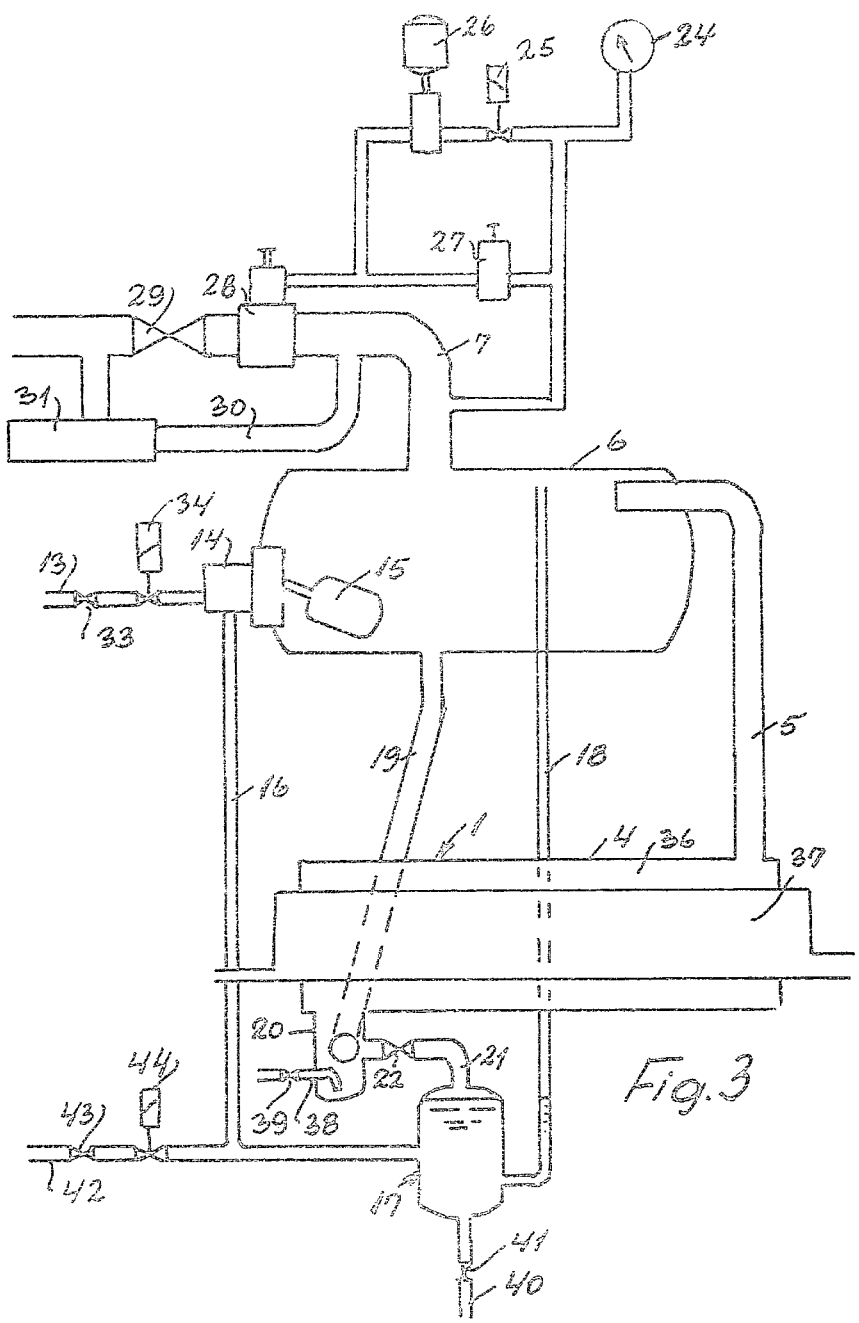
FIG. 3 shows the part of the plant shown in FIG. 2 during a stop period, FIG. 4 on a further increased scale shows a section of an oil separator belonging to the plant shown in FIG. 1 and shown under operating conditions.

A part of the plant is shown more detailed in FIGS. 2 and 3, from which it will be seen that the suction pipe 7 is connected with a control system comprising a manometer 24, a solenoid valve 25, a motor-driven pilot valve 26, a manually operated pilot valve 27, and a servo valve 28, and, moreover, it will be seen that a shut-off-valve 29 is inserted in the suction pipe 7 and that a bypass conduit 30 is connected to the suction pipe 7 in a parallel with the shut-off-valve 29 and the servo valve 28, and that a safety valve 31 is inserted in the bypass conduit 30. The control system is known per se and, accordingly, needs no further explanation. However, it should be mentioned that the control system allows both a manual and an automatic control of the plant.

Moreover, from FIGS. 2 and 3 it will be seen that a shut-off-valve 33 and a solenoid valve 34 are inserted in the conduit 13 from the condenser. Moreover, it will be noticed that the evaporator compartment 36 defined by the jacket 4 extends along the full circumference of the part 37 of the apparatus to be cooled, and which may consist of a cylinder through which the material to be cooled or frozen is passed by transport means known per se and, accordingly, not further illustrated. The transfer pipe 5 opens into the top of the liquid separator 6 and the same applies as regards the riser pipe 18 from the oil separator 17. Moreover, it appears that the pocket 20 is in free communication with the evaporator compartment 36 at the bottom of the compartment, and that the downpipe 19 opens into the pocket 20. Moreover, the pocket is provided with an oil discharge pipe 38 and a corresponding valve 39. Moreover, the oil separator 17 is provided with an oil discharge pipe 40 wherein a shut-off-valve 41 is provided.

A connecting conduit 42, cf. FIG. 1, connects the pipe connection 16 and the conduit 9, extending between the pressure side of the compressor and the condenser 10. In the connecting conduit 42 a shut-off-valve 43 and a solenoid valve 44 are arranged as shown in FIGS. 2 and 3 in such a way that hot vapour may be conducted through the oil separator 17, as required.

Figure 4:
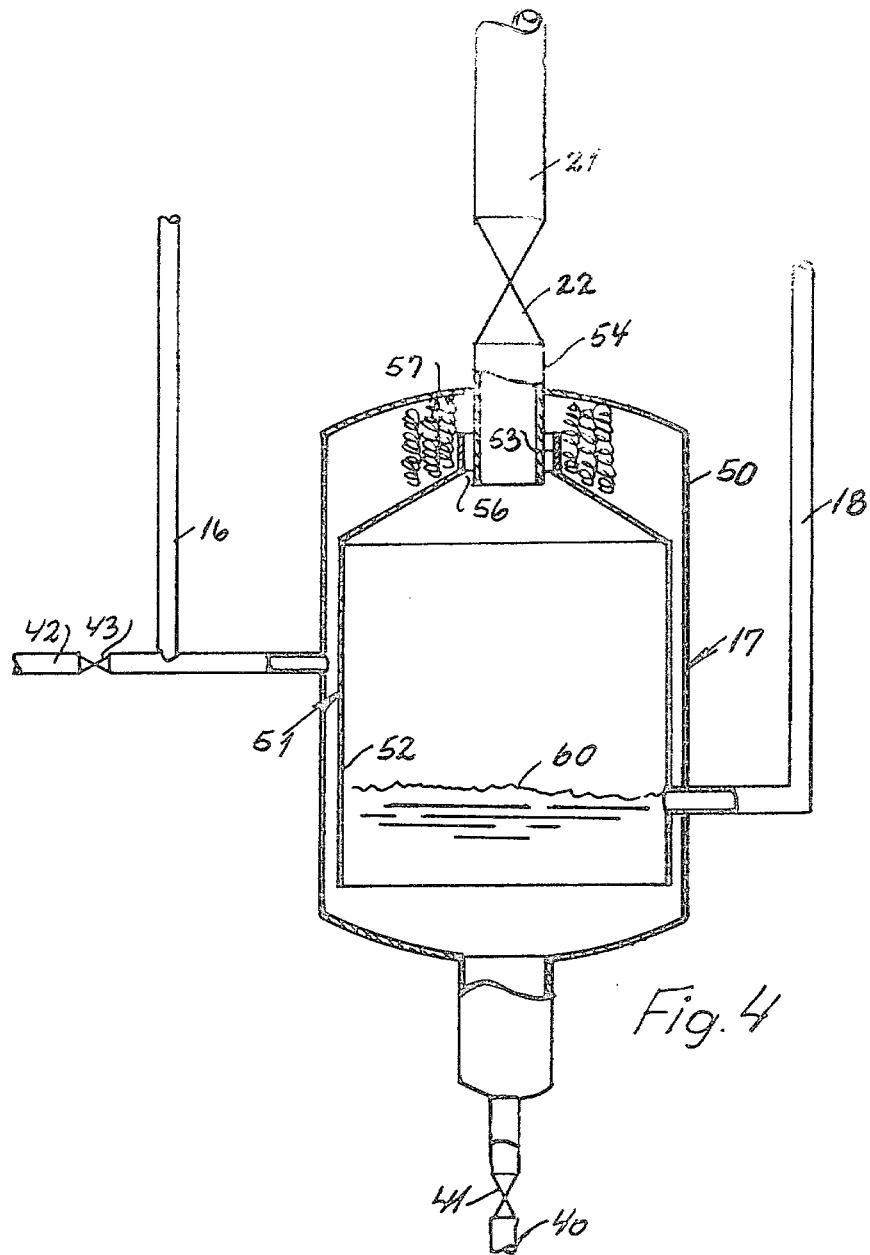

The oil separator 17 is shown on an increased scale and in section in FIGS. 4 and 5. The oil separator 17 comprises an outer container 50 wherein a bell shaped baffle 51 is inserted in such a way that the skirt 52 of the baffle forms a small space with respect to the wall of the container 50. The skirt 52 extends far downwardly into the container 50 and to a level which is positioned below the location at which the riser pipe 18 is connected with the oil separator. As it appears from the drawing, the riser pipe 18 is connected with the interior of the bell shaped baffle.

The pipe connection 16 from the control valve 14 opens into the container 50 opposite the skirt 52 of the baffle at a higher level than the level at which the riser pipe 18 is connected. At the top the baffle comprises a collar 53 which surrounds a pipe stub 54 which extends into the container 50 and which via the pipe 21 and the valve 22 is connected with the pocket 20. Between the collar 53 and the stub 54 a space 56 is provided, through which vapour may flow into the interior of the bell shaped baffle 51 and from there upwards through the riser pipe 18. Between the top of the baffle and the top of the container 50, an oil drop collecting material 57 is arranged around the collar 53.

The plant illustrated operates in the following way:

During operation (FIG. 2) the valve 22 is closed and, accordingly, the refrigerant arriving from the condenser 10 flows through the conduit 13 and the control valve 14 downwardly through the pipe connection 16 and into the oil separator 17. During the passage of the control valve 14, some of the refrigerant will evaporate due to the pressure drop across the control valve 14 and, accordingly, a mixture of liquid and vapour will flow into the oil separator. This mixture impinges the skirt 52 and the liquid will flow into the container 50 below the lower edge of the skirt 52, whereas the vapour will be caused to pass the material 57 and flow into the interior of the baffle 51. Due to the fact that the compressor 8 sucks from the liquid separator 6, liquid and vapour from the oil separator 17 will be conducted upwards through the riser pipe 18 and will be delivered to the liquid separator 6 above the level adjusted by the float 15. Via the downpipe 19, the evaporator compartment 36 will be supplied with the necessary amount of refrigerant and evaporation will be caused in the evaporator compartment 36 due to the free connection between the compartment 36, via the transfer pipe 5, and the interior of the liquid separator 6 which communicates with the suction pipe 7 of the compressor.

Accordingly, before the liquid is fed to the liquid separator 6 and from there to the evaporator compartment 36, the liquid will pass through the oil separator 17 and provided the oil separator is well isolated, no evaporation of importance will occur in the separator 17 and, accordingly, the liquid has an excellent opportunity as regards separation of oil which may be discharged via the valve 41. Accordingly, during the operation of the plant, a liquid surface 60 will be adjusted in the oil separator as illustrated in FIG. 4, and due to the level difference between the pipe connection 16 and the riser pipe 18, no vapour will flow through the liquid in the oil separator 17. Instead, the vapour will be forced through the material 57 and into the interior of the baffle 51 via the space 56.

If it is requested during the operation of the plant to stop the plant rapidly, e.g. because a danger exists that the ice cream in the apparatus 1 should be frozen into a too rigid state, it is important to prevent evaporation in the evaporator compartment 36 immediately. This is achieved by opening the valve 22 in the connecting pipe 21 between the pocket 20 and the oil separator 17 whereby the liquid which may be present in the evaporator compartment 36 will be transferred to the oil separator 17 due to the gravity. Accordingly, cooling in the evaporator compartment 36 stops immediately. Moreover, also the liquid contained in the liquid separator 6 will be transferred to the oil separator 17 via the downpipe 19 and the pocket 20. Simultaneously, of course, the feeding of refrigerant to the control valve 14 is cut off by activating the solenoid valve 34. When cooling in the apparatus 1 later on is requested, suction is caused in the liquid separator 6 and the valve 22 is closed, whereby refrigerant will be sucked up into the liquid separator 6 through the riser pipe 18. Now the liquid separator 6 will feed the evaporator compartment 36 and the plant will operate as previously explained.

I claim:

1. A freezing or cooling plant including a compressor and an apparatus provided with an evaporator compartment for cooling said apparatus and a condenser, the suction side of said compressor being connected to said evaporator compartment, and the pressure side of said compressor being connected to said condenser, an oil separator positioned below the lowermost part of said evaporator compartment, said oil separator being connected with said condenser by means of a pipe connection in which a control valve is provided and which opens into said oil separator at a level below the top of said oil separator, so as to feed liquefied and evaporated refrigerant to said oil separator, said oil separator, moreover, being connected with said evaporator compartment via a riser pipe, said riser pipe opening into said oil separator at a level below the top of said oil separator so as to transfer liquefied and evaporated refrigerant fed to said oil separator from said condenser to said evaporator compartment, and to maintain a refrigerant level in said oil separator below the top of said oil separator, the top of said oil separator moreover being connected with the lowermost part of said evaporator compartment by means of a pipe connection, wherein a valve is provided which is closed during the normal operation of said freezing or cooling plant, and which in open condition allows transfer of liquid refrigerant from said evaporator compartment to said oil separator for emptying said evaporator compartment for liquid refrigerant and stopping cooling of said apparatus.

2. A freezing or cooling plant according to claim 1, wherein said pipe connection from said condenser opens into said oil separator at a level, which is higher than the level at which said riser pipe opens into said oil separator.

3. A freezing or cooling plant according to claim 1, wherein said plant is provided with a liquid separator arranged above said apparatus to be cooled, said liquid separator being connected to the suction side of said compressor via a suction pipe and being connected to said evaporator compartment via a transfer pipe opening into the top of said liquid separator, said liquid separator at the bottom of said liquid separator being connected to said evaporator compartment by means of a downpipe, the top of said liquid separator, moreover being connected to said oil separator via said riser pipe, a float being arranged in said liquid separator, so as to control said control valve provided in said pipe connection connecting said connecting said condenser and said oil separator for controlling the flow of refrigerant to said oil separator, through said oil separator, through said riser pipe and to said liquid separator so as to maintain a predetermined level of liquefied refrigerant in said liquid separator.

4. A freezing or cooling plant according to claim 1, wherein said oil separator comprises a container, wherein a bell shaped bell is arranged, the lower edge of said baffle being arranged at a level below the level at which said pipe connection connecting said condenser and said oil separator opens into said oil separator, the interior of said baffle being connected with said riser pipe, the top of said baffle being provided with a collar surrounding a pipe stub so as to provide a flow passage for evaporated refrigerant, said pipe stub being connected with the lowermost part of said evaporator compartment via said pipe connection, oil drop collecting material being arranged around said collar and between the top of said baffle and the top of container.

\* \* \* \* \*